United States Patent [19]
Crane et al.

[11] Patent Number: 5,308,992
[45] Date of Patent: May 3, 1994

[54] CURRENCY PAPER AND BANKNOTE VERIFICATION DEVICE

[76] Inventors: Timothy T. Crane, Box 78, Dalton, Mass. 01226; Robert J. Danek, 84 Hendee Rd., Andover, Conn. 06232; Steven K. Harbaugh, 18725 Edwin Markham Dr., Castro Valley, Calif. 94552; Richard A. Menelly, 87 Belden Rd., Burlington, Conn. 06013

[21] Appl. No.: 814,824

[22] Filed: Dec. 31, 1991

[51] Int. Cl.$^5$ .............................................. G06K 5/00
[52] U.S. Cl. ..................................... 250/556; 356/71
[58] Field of Search .............. 250/556; 382/7; 356/71; 283/85, 91; 209/534

[56] References Cited

U.S. PATENT DOCUMENTS

| | | | |
|---|---|---|---|
| 3,980,990 | 9/1976 | Berube | 340/149 |
| 4,524,276 | 6/1985 | Ohtombe | 250/338 |
| 4,652,015 | 3/1987 | Crane | 283/91 |
| 4,761,205 | 8/1988 | Crane | 162/103 |
| 4,973,851 | 11/1990 | Lee | 356/71 |
| 4,980,569 | 12/1990 | Crane et al. | 250/556 |
| 5,151,607 | 9/1992 | Crane et al. | 250/556 |

Primary Examiner—David C. Nelms
Assistant Examiner—S. B. Allen

[57] ABSTRACT

A photodiode and a phototransistor are positioned on opposite sides of a document subjected to verification for authenticity under transmitted light. A logic circuit determines the presence or absence of the security feature and correspondingly provides visual or audible indication thereof. The photodiode, phototransistor and related circuitry are arranged within an enclosure that is attached to a currency receiving device such as a cash register. The visual or audible indicators are mounted on the cash register for immediate indication of the currency verification to the cashier. A simplified capacitive proximity sensor can be employed, per se, for inexpensive applications or for redundant verification in combination with an optical detector. The shape of the capacitive sensor is configured to that of the security thread to discriminate between the security thread and the currency paper. Additional optical circuits are employed to detect counterfeit markings on the currency surface.

21 Claims, 6 Drawing Sheets

CURRENCY PAPER AND BANKNOTE VERIFICATION DEVICE

BACKGROUND OF THE INVENTION

The use of a metallized plastic strip embedded within currency paper as a security thread for counterfeit deterrence is described within U.S. Pat. Nos. 4,652,015 and 4,761,205, which Patents are incorporated herein for purposes of reference. The security thread is virtually undetected under reflected light and legible under transmitted light to verify its presence.

In commercial situations where verification of currency bills is required, the receiver of the currency bill should subject the currency to a relatively intense light source to read the security thread under transmitted light. With large queues of customers at a bank or supermarket, as well as in places of low level illumination such as bars and restaurants it is difficult to visually inspect the corresponding large number of currency bills. It would be advantageous therefore to have some means of automatically determining the presence of the requisite security thread and confirming authenticity to the teller or cashier.

U.S. Pat. No. 3,980,990 entitled "Ferromagnetic Currency Validator" describes a magnetic detection circuit which first submits a proffered currency paper to a magnetic source to magnetize the ferromagnetic ink used with the signature on the portrait surface of the bill.

U.S. Pat. No. 4,524,276 entitled "Apparatus for Detecting a Security Thread Embedded in a Paper-Like Material" describes an infrared radiation source and two infrared radiation detectors used to determine whether or not a security thread is embedded in the paper-like material and also what the detected security material is made of.

Countries outside of the United States that employ plastic or metal security threads embedded in their paper currency, require that the presence of such security threads be ascertained under transmitted light such as described in the aforementioned U.S. Pat. No. 4,524,276. In accordance with the United States requirement that the currency security thread be detected under transmitted light and not seen under reflected light, both reflective and transmissive determinations must be made for complete verification of the currency.

U.S. Pat. No. 4,980,569 describes a security paper verification device wherein optical means are arranged on opposing surfaces of the currency to determine the absence of any device on the surface of the currency while detecting the presence of the device within the currency. This is to prevent attaching counterfeit security threads to the outside surface of the currency while ascertaining that the genuine security thread is embedded within the currency.

U.S. Pat. No. 5,151,607 filed May 2, 1991 entitled "Currency Verification Device" describes combination of optical means with inductive or capacitive sensors for verifying the presence of the security thread in currency paper.

In some applications, a simple infrared transmissive photodiode and photodetector could be used to indicate the presence of the security thread within currency after a visual inspection of the currency surface to insure that the currency appears genuine.

In other applications, the magnetic sensor could provide indication of the currency denomination by quantitizing the amounts and locations of the magnetic oxides used with the different denominations and using such denomination information for automated currency sorting.

Accordingly, one purpose of the invention is to provide a simple security device that will optically detect a genuine security thread within the currency paper after optical inspection of the outer surface of the currency paper. An additional purpose of the invention is to describe customized magnetic and capacitive sensors that respond to both the metal materials used to form the security thread within the currency as well as the magnetic oxides used with the currency signatures to provide verification of the presence within the currency after such visual inspection of the currency surface. Additionally, the invention proposes to determine the currency denomination and to provide such denomination information to a currency receiver and/or to currency sorting equipment.

SUMMARY OF THE INVENTION

Currency verification is made by means of a photodiode arranged on one side of paper currency to excite a corresponding phototransistor arranged on an opposite side thereof to verify the presence of the embedded security thread. Upon energizing the photodiode, an associated logic circuit determines whether the associated phototransistor on the other side of the paper appropriately responds thereto. Indication of PASS or FAILURE is provided by means of red and green photo indicators. In a further embodiment, a finely-tuned capacitive sensor is calibrated to respond to the metal material used to form the security thread in an inexpensive non-optical verification arrangement. A magnetic sensor calibrated to respond to the amount of magnetic material in the currency signatures, performs inexpensive verification as well as determining the currency denomination.

DESCRIPTION OF THE PREFERRED EMBODIMENT

Figure 1:
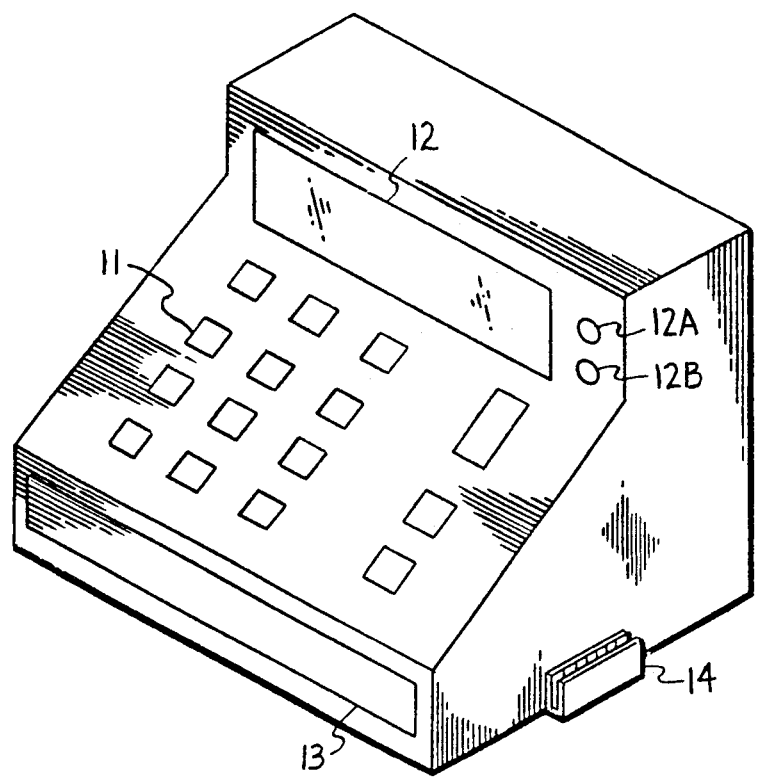
FIG. 1 is a front perspective view of a cash receiver including the verification device according to the invention.

The verification device 14 according to the invention can be used with a cash receiver such as the cash register 10 shown in FIG. 1 with the verification device attached to the cash register next to the cash drawer 13. If desired, the verification device could provide electromagnetic as well as electromechanical interlock with the cash register so that the cash receiver drawer would not open in the event that counterfeit currency is detected within the verification device. The cash register is of the type using a keypad 11 and a display 12 to depict the price of goods being purchased as well as the denomination of the cash proffered by the customer. The same display could automatically register the denomination of the genuine currency within the verification device or, a green light-emitting diode 12A could provide visual indication of genuine currency whereas a red light-emitting diode 12B could indicate the presence of counterfeit currency. The currency that failed the currency verification device could be set aside for separate verification by means of an intense light source whereby the operator would then examine both surfaces of the currency under reflected light to determine whether there is a counterfeit security thread on the surface and then examine the currency under transmitted light to see whether a genuine security thread is embedded within the paper, as described earlier. The outputs of the verification device could be connected in feedback relation with the cash register control circuit to count the change from the cash drawer to speed up the transaction, if so desired.

Figure 2:
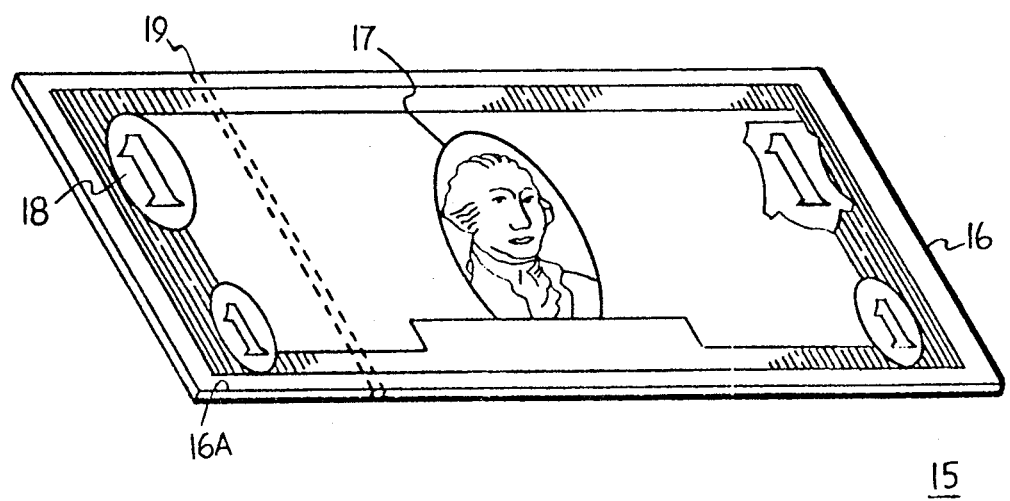
FIG. 2 is a top perspective view of a U.S. currency bill employing a selectively metallized security thread.

FIG. 2 depicts one type of United States currency 15 consisting of a paper bill 16 having the portrait 17 of a United States president or the like and including a security thread 19 embedded therein. The bill is selectively color-printed to enhance the various features printed on both sides of the bill except for a border 16A and currency denomination indicia 18 which retain the basically "white" color of the currency paper prior to printing. It is noted that the security thread extends transversely across the linear extent of the bill from the top to the bottom thereof. The security thread is introduced within the paper in the manner described within the aforementioned U.S. Pat. Nos. 4,652,015 and 4,761,205. The security thread is of the type consisting of a selectively metallized plastic film that is virtually invisible in reflected light and readily apparent under transmitted light. In order to verify the authenticity of such currency, a two-fold test must be performed, whereby the security thread must not be detected upon reflected light and, on the other hand, must be detected under transmitted light.

Figure 3:
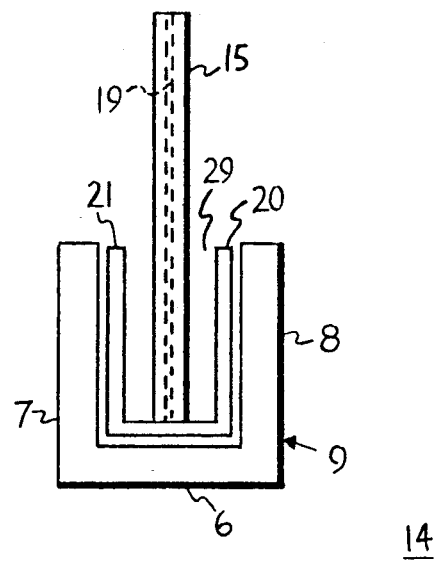
FIG. 3 is an enlarged end view of an edge-testing embodiment of the verification device in accordance with the invention.

A simple verification device 14, shown in FIG. 3, consists of a U-shaped metal or plastic case 9 with two upstanding sidewalls 7, 8 joined by a bottom 6. A pair of printed wire boards 20, 21 joined at the bottom are inserted within the case. Currency verification is achieved by inserting the currency 15 within the slot 29 formed within the printed wire boards between the two sidewalls such that the currency stops against the bottom of the printed wire boards. This, in turn, assures that at least part of the security thread 19 will lie between the optically active parts of the printed wire boards.

Figure 4:
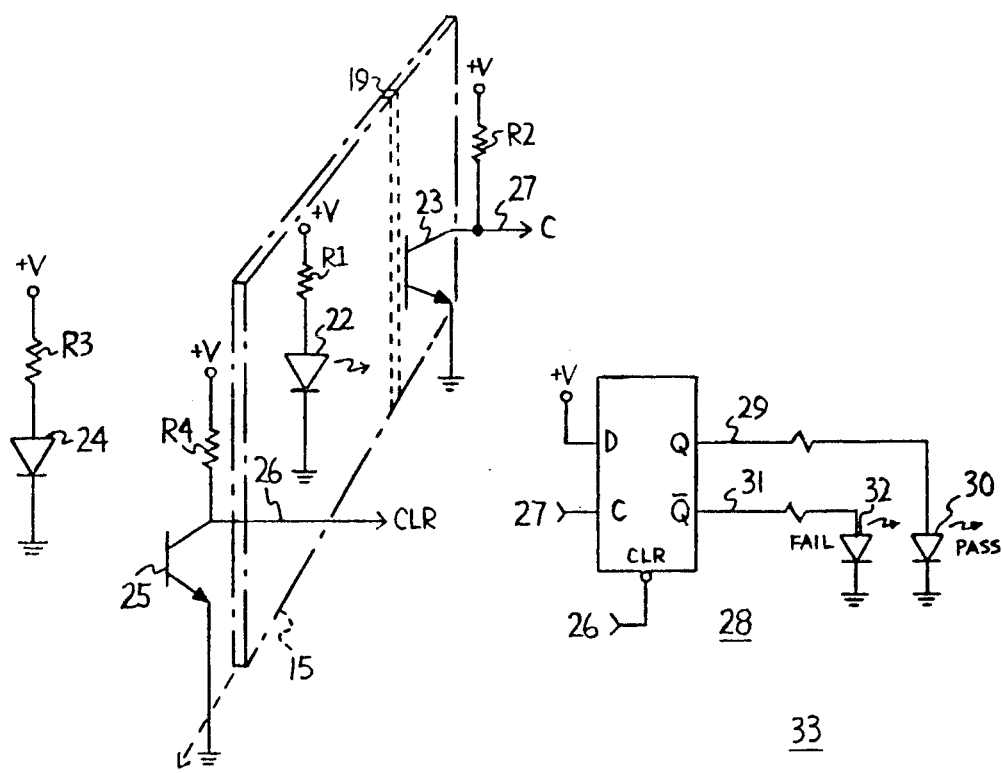
FIG. 4 is a schematic representation of one set of circuit components contained within the verification device of FIG. 3.

A simple optical detection circuit 33 depicted in FIG. 4 is embodied within the verification device 14 of FIG. 3 and operates in the following manner. The currency 15 indicated in phantom is passed by a first IR transmissive LED 22 with a positive bias voltage applied to the anode through a current limiting resistor $R_1$. The cathode of 22 is directly connected with ground. The associated phototransistor 23 is connected to a voltage source through pull up resistor $R_2$ connected to its collector, the emitter is connected to ground. The phototransistor 23 is connected to the C (Clock) terminal of a flip-flop 28 over conductor 27 and $R_2$ is adjusted such that the phototransistor 23 is turned "ON" presenting a low voltage to the C input to the flip flop 28 when the currency is present by transmission of the IR light through the currency paper. Initially the $\overline{Q}$ output of the flip-flop is "high" resulting in a positive voltage to the anode of the RED LED 32 over conductor 31. When the security thread 19, interrupts the IR light to the phototransistor 23, the C terminal on flip-flop goes "high", and the $\overline{Q}$ output goes "low" turning off the RED LED 32 and providing a positive voltage to the GREEN LED 30 over conductor 29 turning on the GREEN LED to thereby indicate the presence of the security thread within the currency. A second LED 24 downstream from the first LED 22 receives a positive voltage to its anode through a second bias resistor $R_3$. The pull up resistor $R_4$ to the associated second phototransistor 25 is adjusted such that the CLR terminal of the flip-flop 28, which is connected to the collector of the second phototransistor over conductor 26, is "low" until the currency 15 passes between the second LED 24 and the second phototransistor 25 to interrupt the IR signal and apply a high voltage pulse to the CLR terminal of the flip flop thereby turning OFF the GREEN LED 30 and turning on the RED LED 32 to reset the optical detection circuit 33. In this circuit, the LED's 22, 24 would be positioned within the first printed circuit board 20 in FIG. 3, on one side of the currency 15 with the phototransistors 23, 25, LED's 30, 32 and flip flop 28 within the second printed circuit board 21 on the opposite side of the currency.

Figure 5:
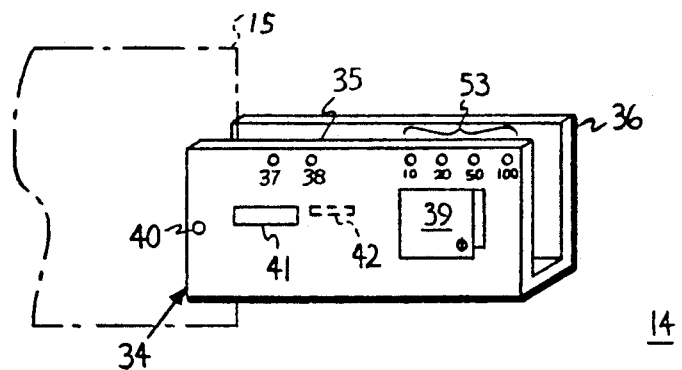
FIG. 5 is a front perspective view of a currency testing device including a magnetic circuit for determining the currency denomination.

A similar stand-alone verification device 14 is depicted in FIG. 5 in the form of a U-shaped printed wire board 34 having a front board 35 and a rear board 36, as indicated. A control circuit 39 controls the ON and OFF states of a GREEN LED 37 to indicate when the currency 15 shown in phantom is genuine and the RED LED 38 to indicate a counterfeit. An LED 40 and associated circuitry, indicates the leading edge of the currency and a magnetic sensor 41 such as obtained from American Magnetics Corporation, Carson, Calif. magnetically senses the amount of magnetic material in the iron oxide material contained within the currency signatures for comparison with predetermined values stored within the associated circuit 39 to determine the currency denomination. Since the amount of the iron oxide used within the currency signatures varies in accordance with the various denominations, the presence of the iron oxides indicates the genuineness of the currency while the quantity thereof indicates the currency denomination. The associated indicating diodes 53 correspondingly indicate ten dollar denominations, twenty dollar denominations, fifty dollar denominations and one hundred dollar denominations. To substantially increase the sensitivity of the magnetic sensor, a corresponding electrically-grounded metallic strip 42 is arranged on the rear board opposite the location of the magnetic signatures.

Figure 6:
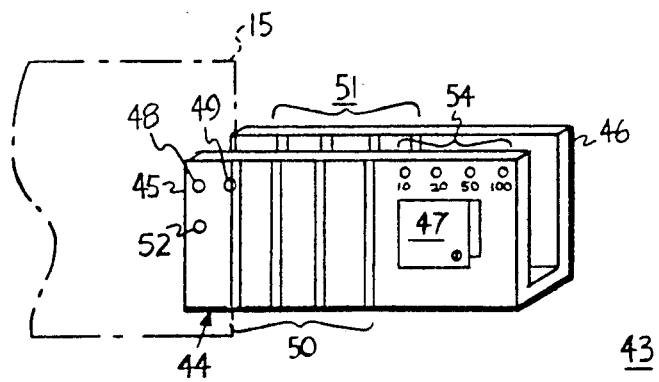
FIG. 6 is a front perspective view of a currency testing device including distributed capacitive sensors for determining the currency denomination.
Figure 7:
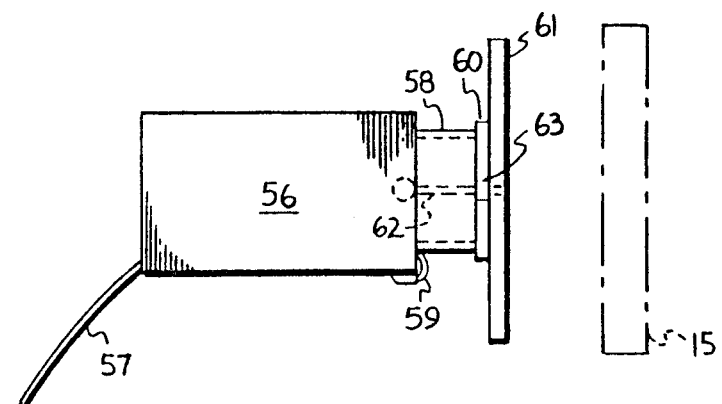
FIG. 7 is a side view of a capacitive sensor configuration coextensive with the security thread.

A capacitor verifier unit 43 is depicted in FIG. 6 and consists of a similar U-shaped printed wire board 44 having a front board 45 joined to a rear board 46, as indicated. The control circuit 47 on the front board allows the sensitivity of the capacitive sensors 50 on the front board to be adjusted. One such capacitive sensor is a model PCX-30 obtained from Gordon Products, Inc., Brookfield, Connecticut. A similar LED 52 and associated circuitry indicates the edge of the preferred currency 15 indicated in phantom and the capacitive sensors 50 are arranged according to the currency denomination. Since the security threads are positioned within the currency according to the currency denomination, the position of the security thread indicates the currency value even when the security thread for two denominations overlap. This information is stored within the memory contained within the control circuit 47. The dimensions of the capacitive sensors correspond to the length and width of the embedded security thread. The dimensions of the electrically-grounded strips 51 arranged on the rear board also are co-extensive with those of the embedded security thread for increased detection accuracy. The presence of the security thread is indicated by operation of the GREEN LED 49 and the absence thereof as indicated by the RED LED 48 in a manner similar to that described for the optical detection circuit 33 shown earlier in FIG. 4. The sensitivity of the capacitive sensors is adjusted such that the RED LED remains ON or in the absence of the metal characters within the embedded security thread. When the metal characters are sensed by any of the capacitive sensors 50, the control circuit 47 responds to turn OFF the RED LED and turn ON the GREEN LED to signify the presence of the security thread. The associated LEDs 54 can become selectively illuminated to indicate the actual denomination of the currency, if so desired. To substantially increase sensitivity to the selectively metallized security threads, the capacitive sensors 50 within the capacitive sensor unit 55 shown in FIG. 7 have the configuration indicated at 61 wherein the capacitive sensor is configured as a fine wire sensor element coextensive with the geometry of the embedded security thread. When the currency 15 shown in phantom is brought into proximity with the capacitive sensor unit 55, the bulk of the paper will have little effect on the excitation of the fine wire sensor element 61. To further concentrate the effects of the sensor element, a standard capacitive proximity sensor such as a type CR215DB obtained from GE Company, is modified by positioning the sensor element 61 against the dielectric disk 60 that separates the cylindrical capacitive element 58 from the printed wire board 56. The cylindrical element is electrically connected with the printed wire board by means of a wire conductor 59. The capacitive sensing element 61 is connected with the printed wire board by means of a separate conductor 62 that passes through the cylindrical element 58 and the dielectric disk 60, through an aperture 63. The power conductors 57 electrically connect the printed wire board with a variable power supply to adjust the sensitivity of the circuit contained within the printed wire board in relation to the distance between the currency 15 and the sensing element 61.

Figure 8:
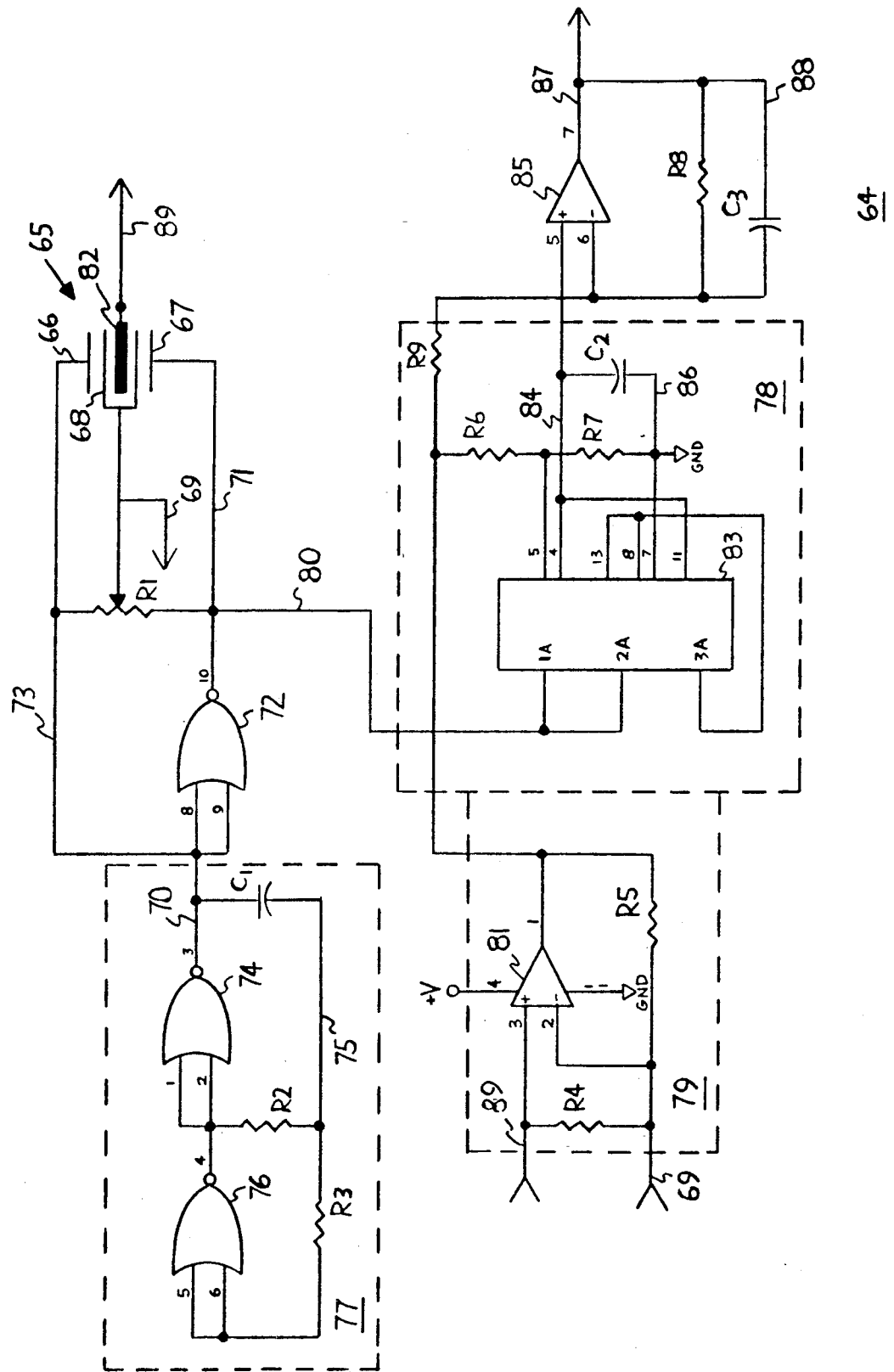
FIG. 8 is a schematic representation of a circuit used with the capacitive sensor in accordance with the invention.

A capacitive sensing circuit 64 is shown in FIG. 8 and includes an oscillator circuit 77 which contains an OR-GATE 76 having its inputs connected together and to the output of a second OR-GATE 74 through a resistor $R_3$ and a capacitor $C_1$ over conductor 75. The inputs to the second OR-GATE 74 are electrically connected to the midpoint between resistor $R_3$ and capacitor $C_1$ through a bias resistor $R_2$. The output of OR-GATE 74 is connected via conductor 70 with the two inputs to a third OR-GATE 72 and with a first capacitive plate 66 over conductor 73. The output of OR-GATE 72 is connected with a second capacitive plate 67 by means of conductor 71 and with a guard electrode 68 through the variable resistor $R_1$. The guard electrode forms part of the sensor bridge 65 including the capacitive plates 66, 67, guard electrode 68 and sensor element 82. The details of the sensor bridge are essential to the operation of the sensing circuit and will be described below in greater detail. The guard electrode 68 connects with one input to a first operational amplifier 81 within the amplifier circuit 79 by means of conductor 69. The sensor element 82 connects with the other input to the first operational amplifier over conductor 89. The first operational amplifier 81 is provided with a positive DC voltage which is referenced to ground. The output of the OR-GATE 72 which connects the oscillator circuit 77 with the sensor bridge 65 also connects with the 1A and 2A input terminals of an analogue switch 83 within the detector circuit 78 over conductor 80. One example of an analogue switch is a type CD14007 obtained from RCA. The 3A input terminal to the switch is connected in common with the switch output terminals 8 and 13. The switch output terminal 4 connects in common with switch output terminal 11 and with a first input to a second operational amplifier 85 over conductor 84. The switch output terminal 5 connects with the midpoint between resistors $R_6$, $R_7$ and to the second input to the second operational amplifier 85 through resistor $R_9$. Switch output terminal 7 connects between resistor $R_7$ and ground and with the second input to the second operational amplifier through capacitor $C_2$ and conductor 86. The switch comprises part of the detector circuit 78 in combination with the resistors $R_6$, $R_7$, $R_9$ and capacitor $C_2$. The output of the second operational amplifier 85 connects back with its second input in a feedback loop which includes capacitor $C_3$ and resistor $R_8$ over conductor 88 and to an indicating diode or control circuit similar to that shown earlier in FIG. 4 over conductor 87.

Figure 9:
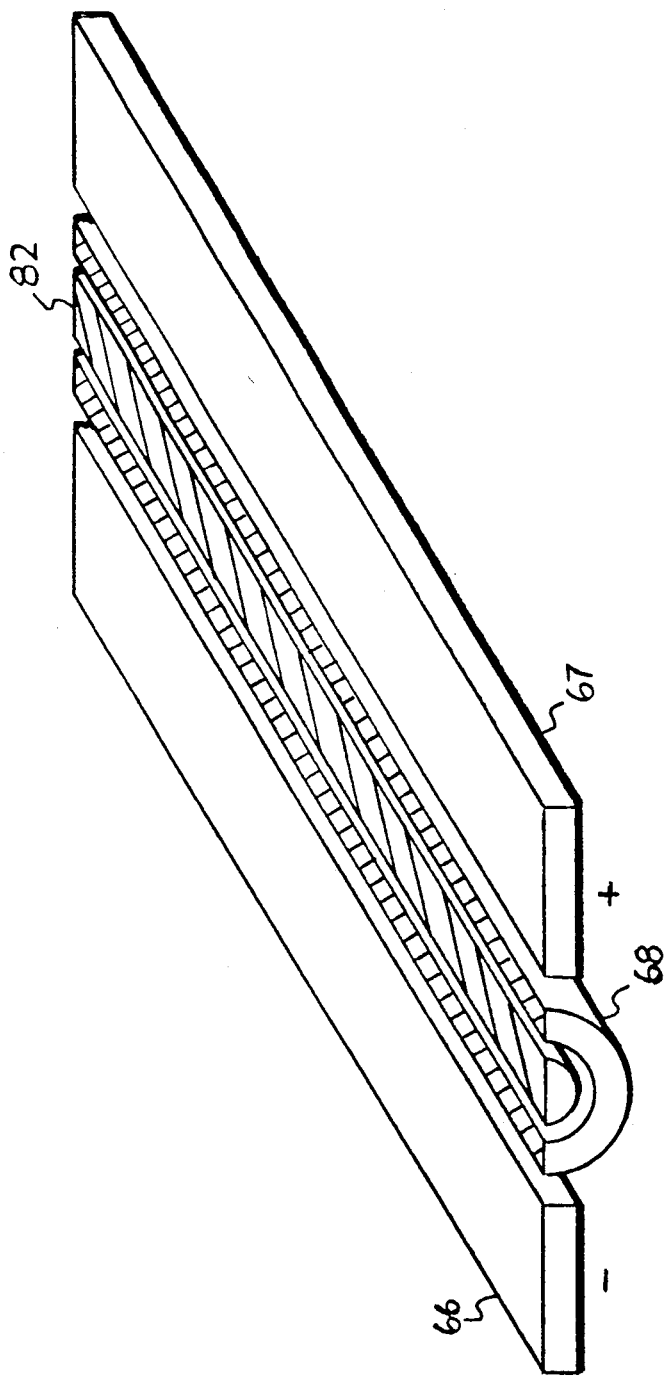
FIG. 9 is an enlarged top perspective view of the sensor element used with the circuit of FIG. 8.

The sensor bridge 65 has the configuration depicted in the enlarged representation shown in FIG. 9 wherein the capacitor plates 66, 67 are arranged as the planar antennas of the oscillator circuit 77 (FIG. 8). The sensor element 82 is a cylindrical wire having a diameter equivalent to the thickness of the security thread 19 (FIG. 2) and a length coextensive with the length of the security thread to electrically "match" the detector element to the security thread. This dimensional relationship between the sensor and the security thread reduces the effects of the larger mass of the currency paper. To further reduce the effects of the currency paper on the sensor element, the sensor element is surrounded by and spaced apart from the guard electrode 68 which surrounds the sensor element and which electrically "tunes" the enclosed sensor element by adjustment of the variable resistor $R_1$ which connects between the guard electrode and the analogue switch 83 (FIG. 8).

The operation of the sensor circuit 64 is best understood by referring to both FIGS. 8 and 9 wherein the oscillator 77 produces 220 KHz signals that are 180 degrees out of phase. The signals are inputted to the sensor bridge 65 via capacitive plates 66, 67 which form a balanced bridge. The symmetrical configuration of the sensor bridge 65 equally couples the output-of-phase signals on the capacitive plates to the sensor element 82. Adjustment of the variable resistor $R_1$ connected with the guard electrodes 68 compensates for any imbalance between the sensor element and the plates to achieve a signal null. The amplifier is configured as a unity gain voltage follower which provides a low impedance voltage to the guard electrode that is the same as the oscillator signal voltage. The "boot strap" configuration between the guard electrode and the sensor element reduces any stray capacitance between the sensor element and ground as well as between the sensor element and the capacitor plates to substantially improve the sensitivity of the sensor element. Accordingly, when the security thread (FIG. 2) is parallel to the sensor element, a capacitance unbalance is created due to the unequal coupling between the sensor element and the capacitive plates. This results in a signal which is inputted to the amplifier circuit 79 in proportion to the phase and voltage level of the voltage imbalance. The resulting voltage appearing on the output of the second operational amplifier 85, on conductor 87 is used to energize an associated LED such as depicted at 12A in FIG. 1 to indicate the presence of the security thread. The matching of the geometry of the sensor element to that of the security thread is an important feature of the invention. The provision of the guard electrode to adjust the sensitivity of the oscillator to the presence of the security thread effectively eliminates any false signal indication caused by stray capacitance. It is believed that the conductive nature of the aluminum material within the security thread effectively brides the guard electrode to couple the oscillator signal with the sensor element.

Figure 10:
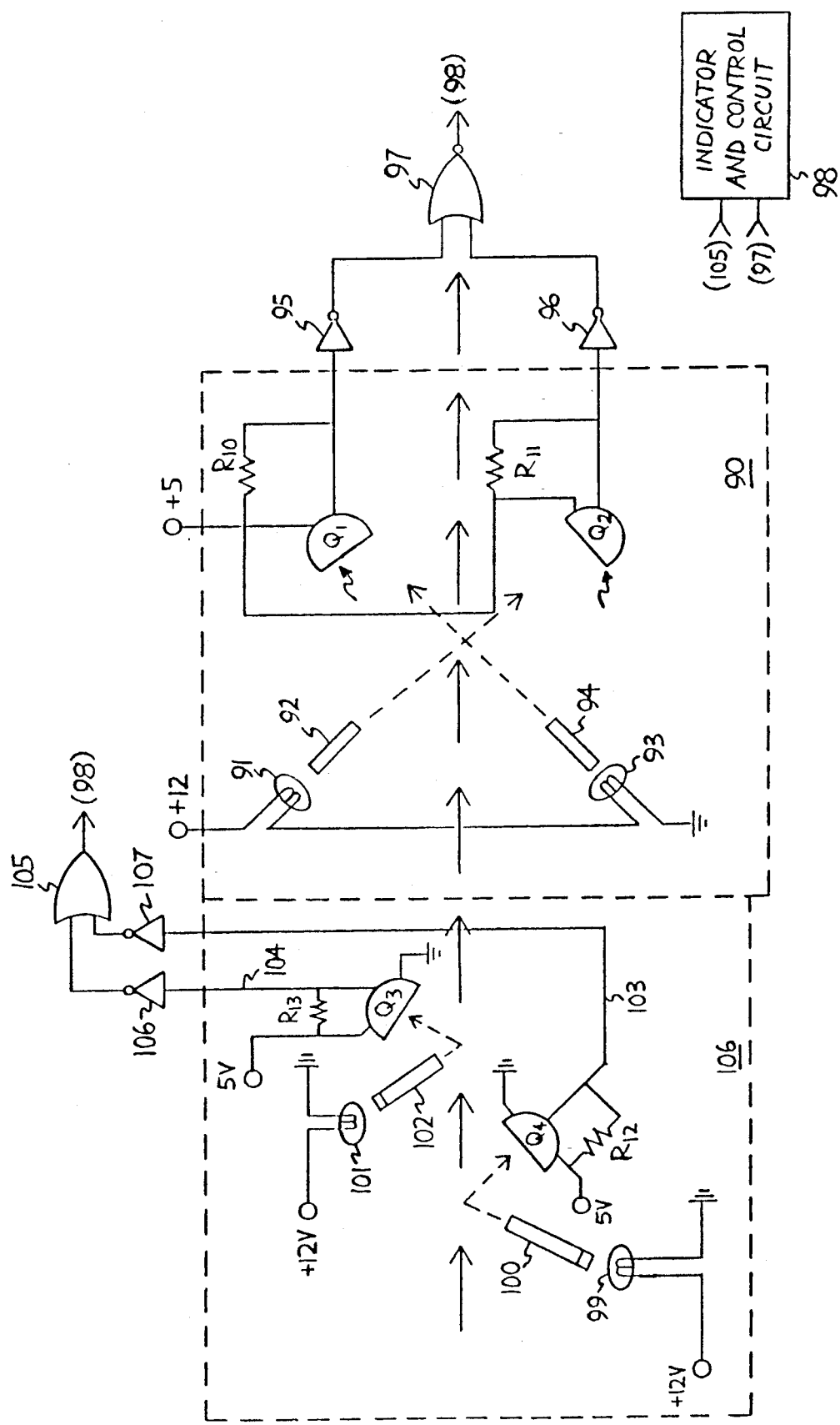
FIG. 10 is an optical detection circuit for inspecting both surfaces of the currency paper along with optical verification of the embedded security thread.

In combination with the optical sensing detector described in aforementioned U.S. Pat. No. 4,980,569 which senses the presence of the embedded security thread by optical transmission while inspecting the currency surface under specular reflection to ensure that the selectively metallized security thread is within the currency paper and not arranged on either surface thereof, the circuit of FIG. 10 includes further optical means for determining the presence of a dark line printed on the currency paper surface in a attempt to block the transmitted light without reflection. The optical detection circuit 90 from aforementioned U.S. Pat. No. 4,980,569 includes a pair of light sources 91, 93 arranged on the opposite sides of the proffered currency paper which follows the path of direction indicated by the solid arrows. Corresponding optical fibers 92, 94 culminate and direct the light beam indicated in dashed lines in the direction of the phototransistors $Q_1$, $Q_2$ which are biased by means of resistors $R_{10}$, $R_{11}$. The presence of the security thread blocks the light from either phototransistor and transfer the information through corresponding inverters 95, 96 to inputs of a first NOR GATE 97. The presence of a reflective material on one surface of the currency is detected by the phototransistor $Q_2$ which receives reflected light from the light source 93. The opposite phototransistor $Q_1$ receives reflected light from the opposite light source 91. In accordance with the teachings of the instant invention, the positioning of a corresponding plurality of phototransistors in positional relation with the denominational placement of the security thread within the currency provides both verification and denomination information which can be used for both currency verification and sorting, as described earlier. The output of the first NOR GATE 97 is connected to an indicator and control circuit 98 to provide the requisite indication and control function. The optical detection circuit 106 uses separate light sources 99, 101 also positioned on the opposing surfaces of the proferred currency paper and includes similar optical fibers 100, 102 to culminate and direct the light onto the currency paper surfaces. Corresponding phototransistors $Q_3$, $Q_4$ are positioned close to the surface of the proferred currency to pick up diffuse reflection from the paper surface in the absence of any dark line. The phototransistors connect through bias resistors $R_{12}$, $R_{13}$, conductors 103-104, and inverters 106, 107 to the inputs of a second NOR GATE 105 for inputting the results to the indicator and control circuit 98. Whereas the phototransistors $Q_1$, $Q_2$ are looking for so-called "specular" reflection, to detect the presence of a reflective counterfeit security thread on the surface of the currency paper, the phototransistors $Q_3$, $Q_4$ are looking for so-called "diffuse" reflection from the currency surface. The absence of such diffuse reflection, caused by the adsorption of the light by a dark line on the currency surface, such information is transmitted back to the indicator and control circuit to indicate the presence of a counterfeit currency. The logic tables for the photodetecting circuit 90 is described in the aforementioned U.S. Pat. No. 4,980,569. The logic tables for the optical detection circuit 106 is best seen by referring to both FIG. 10 and the following logic table where "1" indicates the presence of light and "0" indicates the absence of light as seen at the input to the second AND GATE 105. The resulting logic inputted to the AND GATE generates a logic "1" for a PASS condition and a logic "0" for a FAIL condition.

LOGIC TABLE

| $\overline{Q_3}$ | $\overline{Q_4}$ | AND GATE (OUTPUT) |
| --- | --- | --- |
| 1 | 1 | 1 (PASS) |
| 1 | 0 | 0 (FAIL) |
| 0 | 1 | 0 (FAIL) |
| 0 | 0 | 0 (FAIL) |

For applications within commercial banks wherein the sensor circuit is used for verification, sorting and counting of U.S. currency it is beneficial to use redundant verification of the presence of the security thread. The capacitive circuit of FIG. 8 could be used with the optical circuit of FIG. 10 for both optical and capacitive detection of the security thread while ascertaining that the security thread is within the currency paper and not on the surface. The magnetic detector of FIG. 10 as well as with the capacitive circuit for further redundant verification. The combination of the capacitive detector and circuit of FIG. 5 with the surface reflective components of FIG. 10 would efficiently detect the presence of the security thread while at the same time insuring that the security thread is embedded within the currency paper and not affixed to or printed on the surface thereof.

A plurality of security thread indicating devices have herein been disclosed for effectively determining the presence of a security thread within U.S. currency.

Having thus described out invention, what we claim as new and desire to secure by Letters Patent is:

1. A device for verifying authenticity of currency paper and banknotes comprising:
   a currency receiver arranged for accepting at least one edge of a proferred currency paper;

transmitter means proximate said currency receiver providing a pair of electronic signals of opposite phase;

detector means intermediate said transmitter means adjustably balancing said electronic signals when a security thread comprising a metallized plastic strip is absent from said currency paper; and circuit means connected with said detector means determining an imbalance between said electronic signals when said security thread is within said currency paper.

2. The device of claim 1 wherein said transmitter means comprises a pair of spaced metal plates.

3. The device of claim 1 further including a pair of capacitive plates connected with said transmitter means, said detector means being arranged intermediate said plates.

4. The device of claim 1 wherein said circuit means further includes an amplifier interconnected with said detector means.

5. The device of claim 1 wherein said transmitter means includes a radio frequency oscillator.

6. The device of claim 5 wherein said oscillator comprises a pair of interconnected OR-gates.

7. The device of claim 1 wherein said detector means comprises a metal wire.

8. The device of claim 7 wherein said wire is dimensioned to said security thread configuration.

9. The device of claim 7 including an electrically-conductive sleeve arranged at least partially around said wire and connected with said circuit means reducing stray capacitances between said wire and ground.

10. The device of claim 9 wherein said circuit means further includes an analogue switch.

11. The device of claim 10 wherein said sleeve connects with said analogue switch through a variable resistor.

12. A verification device for determining authenticity of currency and banknotes comprising:

a first optical source positioned on one side of a proferred currency proximate a corresponding first optical sensor, said first optical sensor arranged for detecting reflected light from any reflective counterfeit means on said one side;

a second optical source on said one side proximate a corresponding second optical sensor, said second optical sensor arranged for detecting non-reflected light from any non-reflective counterfeit means on said one side; and logic means connected with said first and second sensors for determining whether said non-reflective or reflective counterfeit means is present or absent from said one side and providing indication thereof.

13. The verification device of claim 12 including capacitive sensing means arranged proximate said currency for detecting whether a security thread is within said currency.

14. The verification device of claim 12 wherein said logic means includes a pair of NOR-gates.

15. The verification device of claim 12 including a GREEN and a RED light-emitter connected with said logic means providing indication of whether said currency is genuine or counterfeit.

16. The verification device of claim 12 including an optical fiber intermediate said first light source and said one side of said currency.

17. The verification device of claim 12 including an optical fiber intermediate said second light source and said one side of said currency.

18. The verification device of claim 12 including a third optical source positioned on an opposite side of said currency proximate a corresponding third optical sensor, said third optical sensor arranged for detecting reflected light from any reflective counterfeit means on said opposite side.

19. The security device of claim 18 including a fourth optical source on said opposite side proximate a fourth optical sensor, said fourth optical sensor arranged or detecting non-reflected light from any non-reflective counterfeit means on said opposite side, said logic means connected with said third and fourth sensors for determining whether said non-reflective or reflective counterfeit means is present or absent from said opposite side and providing indication thereof.

20. The verification device of claim 12 including an additional optical source on said one side and an additional optical sensor on said opposite side, said additional source and said additional sensor arranged for detecting a security thread within said currency.

21. The verification device of claim 20 wherein said additional optical sensor is connected with said logic device for determining whether a security thread is present or absent from said currency and providing indication thereof.

* * * * *